United States Patent
Bruckert et al.

[11] Patent Number: 5,812,540
[45] Date of Patent: Sep. 22, 1998

[54] METHOD AND APPARATUS FOR MITIGATING AN ORPHAN CONDITION IN A SPREAD-SPECTRUM COMMUNICATION SYSTEM

[75] Inventors: Eugene J. Bruckert, Arlington Heights; Janusz Hyziak, Des Plaines, both of Ill.

[73] Assignee: Motorola, Inc., Schaumburg, Ill.

[21] Appl. No.: 746,110

[22] Filed: Nov. 6, 1996

[51] Int. Cl.⁶ .............................. H04Q 7/34; H04Q 7/36
[52] U.S. Cl. ............................................ 370/332; 455/436
[58] Field of Search ................................. 370/331, 332, 370/333, 335; 455/423, 436, 438, 439, 442; 375/200

[56] References Cited

U.S. PATENT DOCUMENTS

| | | | |
|---|---|---|---|
| 5,267,261 | 11/1993 | Blackeney, II et al. | 370/332 |
| 5,475,870 | 12/1995 | Weaver, Jr. et al. | 455/67.1 |
| 5,577,022 | 11/1996 | Padovani et al. | 370/332 |
| 5,590,177 | 12/1996 | Vilmur et al. | 370/332 |
| 5,640,414 | 6/1997 | Blackeney, II et al. | 375/200 |

*Primary Examiner*—Min Jung
*Attorney, Agent, or Firm*—Kenneth A. Haas

[57] ABSTRACT

An orphan condition is mitigated in a spread-spectrum communication system by determining when a remote unit (113) is likely to become an orphan (315) and adjusting remote unit (113) operating parameters (360) to force additional base stations (101, 102) to be added the remote unit's (113) active set. In particular, when it is determined that a remote unit (113) is likely to become an orphan, T_ADD and T_COMP are adjusted so that the remote unit (113) is forced to add additional base stations (101, 102) to its active set. Increasing the number of base stations (101, 102) that a remote unit (113) is communicating with greatly reduces the probability that the remote unit (113) will become an orphan.

14 Claims, 7 Drawing Sheets

METHOD AND APPARATUS FOR MITIGATING AN ORPHAN CONDITION IN A SPREAD-SPECTRUM COMMUNICATION SYSTEM

FIELD OF THE INVENTION

The present invention relates generally to wireless communication systems and, in particular, to mitigating an orphan condition in a spread-spectrum communication system.

BACKGROUND OF THE INVENTION

Wireless communication systems are known to employ handoff methods in which a remote unit (such as a cellular subscriber) is handed off between base stations within the communication system. In particular, when a remote unit moves to the periphery of the serving base station's coverage area, the increase in path loss between the serving base station and the remote unit may create a situation in which another base station can better serve the remote unit. As described in the Electronic Industry Association/Telecommunications Industry Association Interim Standard 95A (TIA/EIA/IS-95A), one such communication system employing handoff is a Code-Division, Multiple-Access (CDMA) spread-spectrum communication system. (TIA/EIA can be contacted at 2001 Pennsylvania Ave. NW Washington D.C. 20006). Handoff in a CDMA communication system may be accomplished by simultaneously communicating with several base stations (referred to as an active set) and replacing a base station within the active set (active base station) if a base station not within the active set is detected having a stronger signal than an active base station.

In particular, TIA/EIA/IS-95A section 6.6.6 requires a remote unit to monitor the active set (i.e., base stations associated with forward traffic channels assigned to the remote unit) and a candidate set (base stations that are not on the active set but have been received by the remote unit) and whenever the pilot signal strength of a base station not in the active set is found to be above a preset threshold (T_ADD), the remote unit sends a Pilot Strength Measurement Message (PSMM) to the base station(s) in the active set. The base station(s) in the active set then assigns a forward traffic channel associated with the candidate pilot to the remote unit and directs the remote unit to perform a handoff to the candidate base station, bringing the candidate base station into the active set. Additionally, when the pilot strength associated with a non-active set candidate base station exceeds the pilot strength associated with a base station in the active set by a preset threshold (T_COMP * 0.5 dB) the remote unit sends a PSMM to the base station(s) in the active set. The base station(s) in the active set then assigns a forward traffic channel associated with the candidate pilot to the remote unit and directs the remote unit to perform a handoff, bringing the candidate base station into the active set.

Due to imbalances in signal quality between the remote unit receiver and the base station receiver caused from imbalances in cell loading, non-reciprocal propagation, equipment imbalances, and/or other environmental conditions, it sometimes happens that a remote unit will not enter handoff with an acceptable base station because the downlink signal from that base station is not strong enough for the remote unit to request a connection (send a PSMM); yet, the base station receives a strong enough signal from the remote unit to enter reverse channel handoff. In other words, a base station may receive a strong uplink signal from a remote unit, while at the same time the corresponding downlink signal received by the remote unit is not as strong as active base stations received signal. This situation, commonly referred to as the "orphan condition," can lead to dropped calls when the remote unit is in one way handoff should the reverse channel quality to the active base station degrade too much. In other words, the remote unit may be dropped (become an orphan remote unit) even though there is an acceptable base station (orphan base station) available for uplink communication. Thus a need exists for a method and apparatus for handoff in a communication system that mitigates the orphan condition.

DETAILED DESCRIPTION OF THE DRAWINGS

Stated generally, the present invention mitigates the orphan condition by determining when a remote unit is likely to become an orphan and adjusting remote unit operating parameters to force the CBSC to add additional base stations to the remote unit's active set. In particular, when it is determined that a remote unit is likely to become an orphan, T_ADD and T_COMP are adjusted so that the remote unit is forced to add additional base stations to its active set. Increasing the number of base stations that a remote unit is communicating with greatly reduces the probability that the remote unit will become an orphan.

The present invention encompasses a method for mitigating an orphan condition in a spread-spectrum communication system. The method comprises the steps of receiving a signal transmitted by a remote unit, measuring a signal quality of the transmitted signal at a base station, and determining when the remote unit is not handing off to an acceptable base station. Next, more base stations are added to an active list in response to the determination.

An alternate embodiment of the present invention encompasses a method for mitigating an orphan condition within a cellular communication system. The method comprises the steps of determining when a remote unit has a high probability of becoming an orphan and adjusting T_ADD or T_COMP based on the determination. The adjustment of T_ADD or T_COMP forces the remote unit to communicate with additional base stations, mitigating the orphan condition.

An alternate embodiment of the present invention encompasses an apparatus for mitigating an orphan condition in a communication system. The apparatus comprises a historical orphan data storage outputting locations where a remote unit has historically been orphaned, location finding equipment outputting a location of a remote unit, and a processor having as an input, the location of the remote unit and the locations where the remote unit has historically been orphaned.

A final embodiment of the present invention encompasses a method for mitigating an orphan condition. The method comprises the steps of determining when a remote unit is likely to become an orphan and selecting a candidate base station based on the determination. Next the candidate base station is tested to determine whether communication with the candidate base station will alleviate an orphan condition. Finally communication is established with the candidate base station based on the test.

Figure 1:
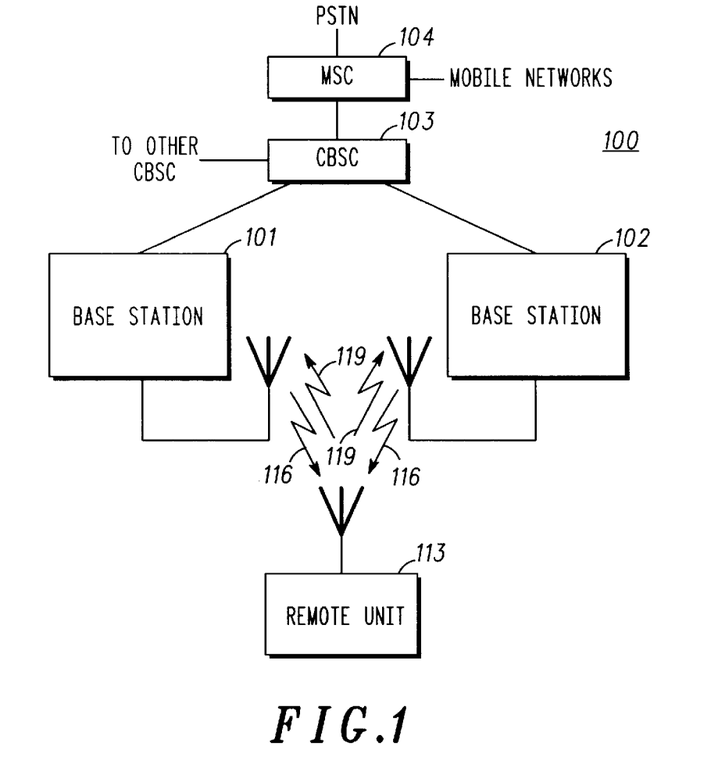
FIG. 1 illustrates communication system in accordance with the referred embodiment of the present invention.

FIG. 1 illustrates communication system 100 in accordance with the preferred embodiment of the present invention. In the preferred embodiment of the present invention, communication system 100 utilizes a Code Division Multiple Access (CDMA) system protocol but in alternate embodiments communication system 100 may utilize other analog or digital cellular communication system protocols such as, but not limited to, the Narrowband Advanced Mobile Phone Service (NAMPS) protocol, the Advanced Mobile Phone Service (AMPS) protocol, the Global System for Mobile Communications (GSM) protocol, the Personal Digital Cellular (PDC) protocol, or the United States Digital Cellular (USDC) protocol. Communication system 100 includes base station 101, base station 102, remote unit 113, Centralized Base Station Controller (CBSC) 103, and Mobile Switching Center (MSC) 104. In the preferred embodiment of the present invention base stations 101 and 102 are preferably Motorola SC9600 base stations, MSC 104 is preferably a Motorola EMX2500 MSC, and CBSC 103 is preferably comprised of a Motorola SG1128BF CBSC component. As shown, remote unit 113 is communicating with base stations 101 and 102 via uplink communication signals 119 and base stations 101 and 102 are communicating with remote unit 113 via downlink communication signals 116. In the preferred embodiment of the present invention, base stations 101 and 102 are suitably coupled to CBSC 103, and CBSC is suitably coupled to MSC 104.

Operation of communication system 100 occurs as follows: Once remote unit 113 accesses communication system 100, remote unit's 113 environmental parameters are determined by CBSC 103. (Further details of determining environmental parameters are discussed below in reference to FIG. 4). Once the environmental parameters of remote unit 113 are determined, CBSC 103 determines if remote unit 113 has a high probability of becoming an orphan. (Further details of determining if a remote unit has a high probability of becoming an orphan are discussed below in reference to FIG. 5). If CBSC 103 determines that an orphan condition is likely, then an attempt is made to add more base stations to remote unit's 113 active list. In the preferred embodiment of the present invention this is accomplished by adjusting T_ADD and T_COMP. In particular, T_ADD is adjusted incrementally from nominal value of −14 dB to a minimum value of −19 dB and T_COMP is adjusted incrementally from +3 dB to a minimum value of 0 dB. (Further details of adjusting T_ADD and T_COMP are discussed below in reference to FIG. 6).

As discussed above, when the strength of a non-active set base station pilot is found to be above T_ADD, or when the strength of a candidate set pilot exceeds the strength of an active set pilot by T_COMP*0.5 dB, a PSMM is sent to the base station and the base station assigns a forward traffic channel associated with that pilot to remote unit 113 and directs remote unit 113 to perform a handoff to the non-active set base station. Thus, by decreasing T_ADD and T_COMP, remote unit 113 is forced into a situation where additional base stations are potentially added to remote unit's 113 active set. Increasing the number of base stations communicating with remote unit 113 greatly reduces the probability that remote unit 113 will become an orphan.

Figure 2:
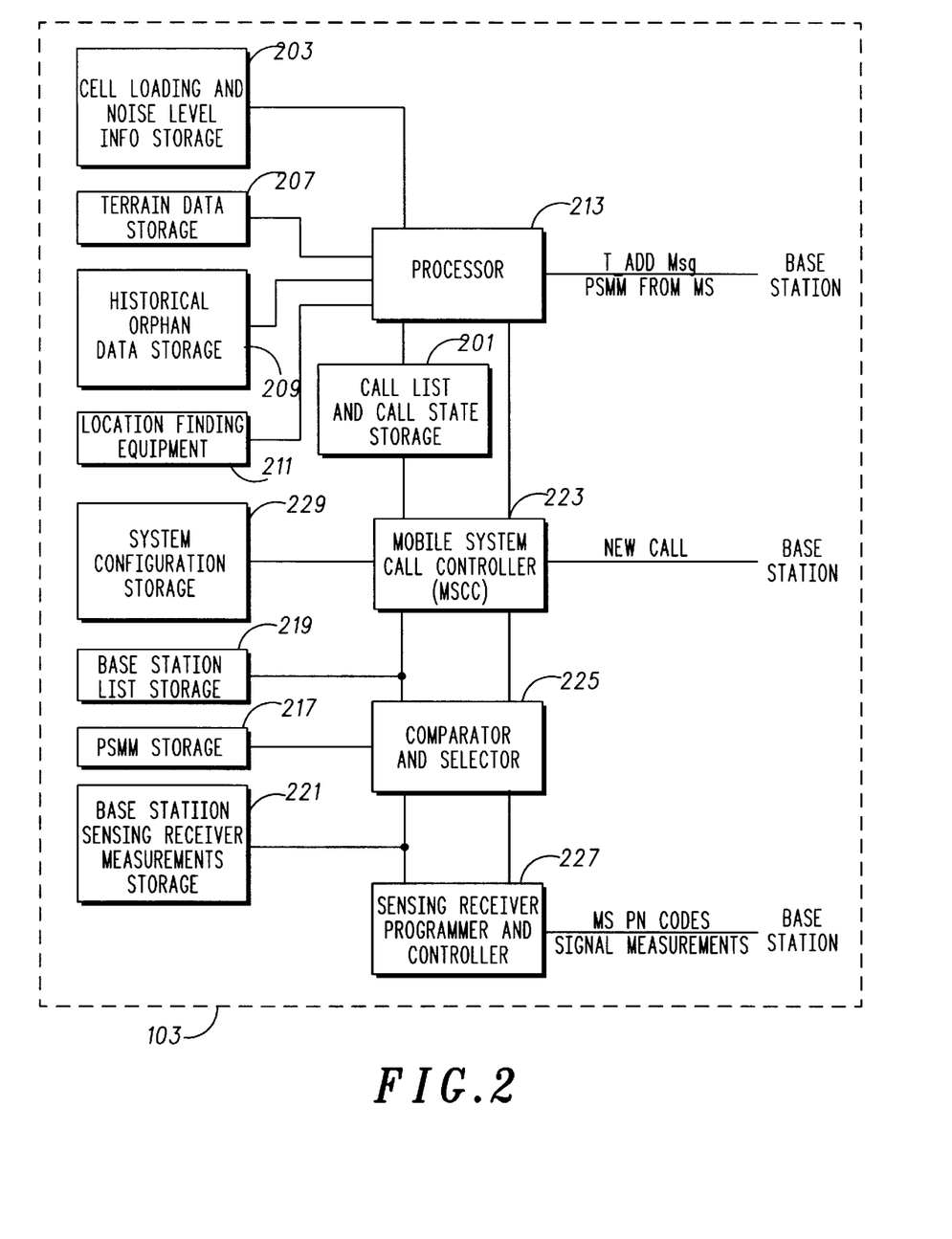
FIG. 2 illustrates a Centralized Base Station Controller of FIG. 1 in accordance with the preferred embodiment of the present invention.

FIG. 2 illustrates CBSC 103 of FIG. 1 in accordance with a preferred embodiment of the present invention. CBSC 103 comprises processor 213, mobile system call controller (MSCC) 223, comparator and selector 225, location finding equipment 211, and sensing receiver programmer and controller 227. As shown, CBSC 103 also comprises storage devices such as call list and call state storage 201, cell loading and noise level information storage 203, terrain data storage 207, historical orphan data storage 209, base station list storage 219, PSMM storage 217, system configuration storage 229, and base station sensing receiver measurement storage 221. As shown in FIG. 2, call list and call state storage 201, cell loading and noise level information storage 203, terrain data storage 207, historical orphan data storage 209, and location finding equipment 211 are suitably coupled to processor 213. Call list and call state storage 201, base station list storage 219, and system configuration storage 229 are suitably coupled to MSCC 223. Base station list storage 219 is also suitably coupled to comparator and selector 225. Base station sensing receiver measurement storage 221 and the PSMM Storage 217 are suitably coupled to comparator and selector 225. Finally, processor 213, MSCC 223, comparator and selector 225, and sensing receiver programmer and controller 227 are suitably coupled to each other with processor 213, MSCC 223, and sensing receiver programmer and controller 227 coupled to suitable base stations. In the preferred embodiment of the present invention, MSCC 223 comprises a Motorola Model #SG1128BF and historical orphan data storage 209 comprises locations where remote unit's have historically been orphaned. Additionally, processor 213 and comparator and selector 225, are PowerPC 604 or comparable processors.

Figure 3:
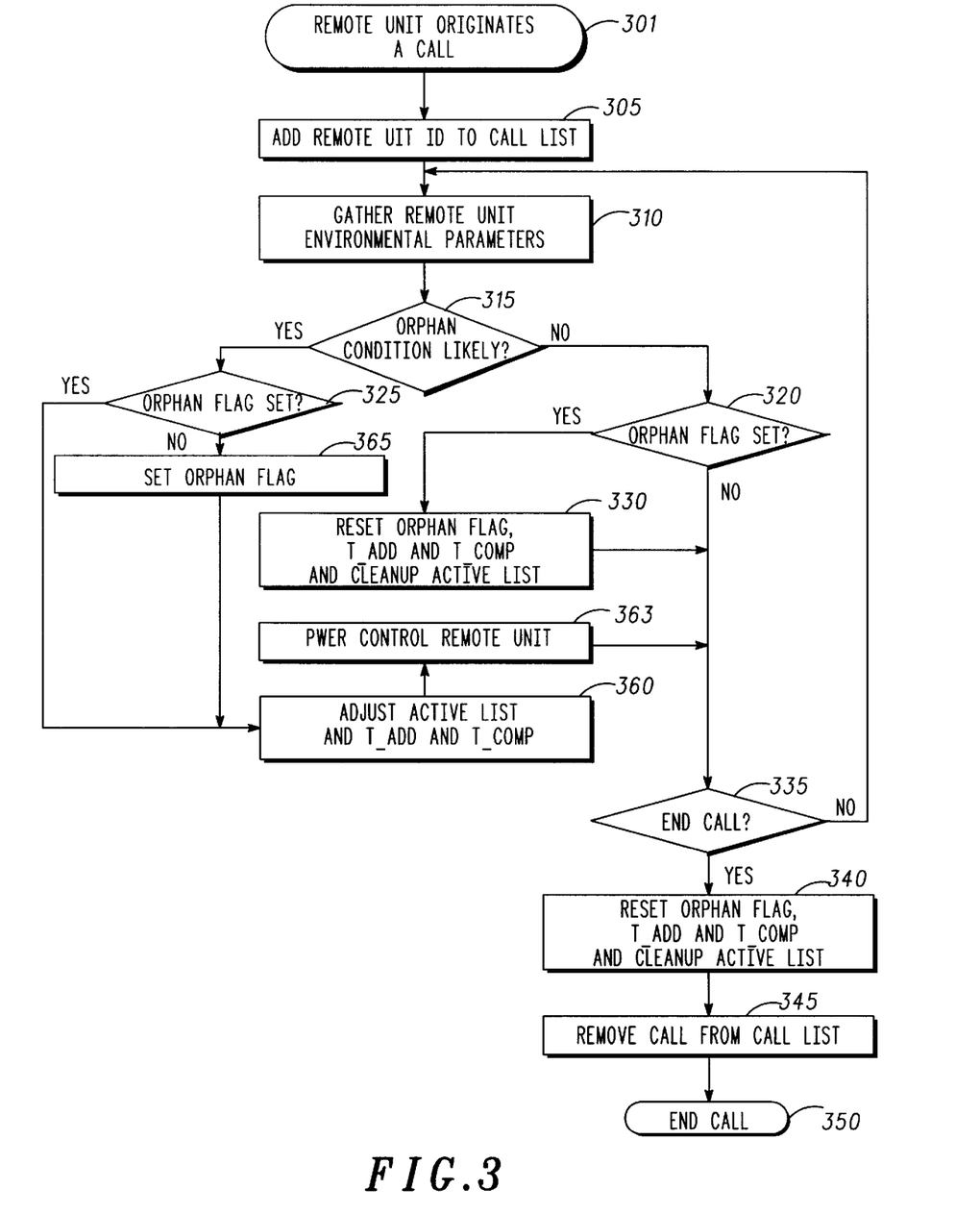
FIG. 3 is a flow chart illustrating operation of the Centralized Base Station Controller of FIG. 2 in accordance with the preferred embodiment of the present invention.

FIG. 3 is a flow chart illustrating operation of CBSC 103 of FIG. 2 in accordance with a preferred embodiment of the present invention. The logic flow begins at step 301 where remote unit 113 originates a call (call may also originate from a landline source). At step 305 MSCC 223 adds remote unit 113 to the call list by storing a remote unit identification number in call list and call state storage 201. Next, at step 310 environmental parameters are gathered regarding the state of remote unit 113. (Further details on gathering environmental parameters are discussed below in reference to FIG. 4). Next, at step 315 processor 213 determines if an orphan condition is likely and if not the logic flow continues to step 320. (Further details on determining if an orphan condition is likely is discussed below in reference to FIG. 5). If at step 315 processor 213 determines that an orphan condition is likely, then at step 325 MSCC 223 determines if an "orphan flag" has been set, and if so, the logic flow continues to step 360. If at step 325 it is determined that the orphan flag has not been set, then at step 365 MSCC 223 sets the orphan flag to a positive state. In a preferred embodiment of the present invention, MSCC 223 accomplishes this by storing a binary "1" in the orphan condition field existing in call list and call state storage 201.

Continuing, at step 360 T_ADD and T_COMP is adjusted dynamically to minimum values of −19 dB and 0 dB respectively. In a preferred embodiment of the present invention T_ADD is incrementally reduced by 1 dB until a minimum value of −19 dB is achieved. Similarly, T_COMP is incrementally reduced by 1 dB until a minimum value of 0 dB is achieved. As discussed above, by decreasing T_ADD and T_COMP, remote unit 113 is forced into a situation where more base stations are potentially added to remote unit's 113 active set. Additionally, at step 360 remote unit's 113 active list is adjusted. In the preferred embodiment of the present invention, this is accomplished by MSCC 223 determining when a base station has been added to the active list and storing the base stations in the active list in base station list storage 219. Next at step 363 remote unit 113 is power controlled to an adequate Frame Error Rate (FER) (1% in the preferred embodiment) and the logic flow continues to step 335. In the preferred embodiment of the present invention remote unit 113 power control is accomplished as described in TIA/EIA/IS-95A section 6.1.2.3.

Returning to step 320, if the orphan flag has been set, then T_ADD and T_COMP are reset to their standard values, the orphan flag is reset to "0" and the active list is cleaned up by removing the orphan base station from the orphan state (step 330) and the logic flow continues to step 335. In the preferred embodiment of the present invention the orphan base station will be added to or remain in the active set if the orphan base station signal has become strong enough to be used by remote unit 113. The orphan base station will be removed from the active set if the orphan base station is no longer used in the reception of remote unit 113. At step 335 MSCC 223 determines if remote unit 113 has ended the call, and if not the logic flow returns to step 310. However, if it has been determined at step 335 that remote unit 113 has ended the call, the logic flow continues to step 340 where MSCC 223 accesses call status record, clears the orphan flag, and resets T_ADD and T_COMP. Next at step 345, MSCC 223 removes remote unit 113 from the call list and call state storage 201 and removes all base stations from base station list storage 219 and the logic flow ends at step 350.

Figure 4:
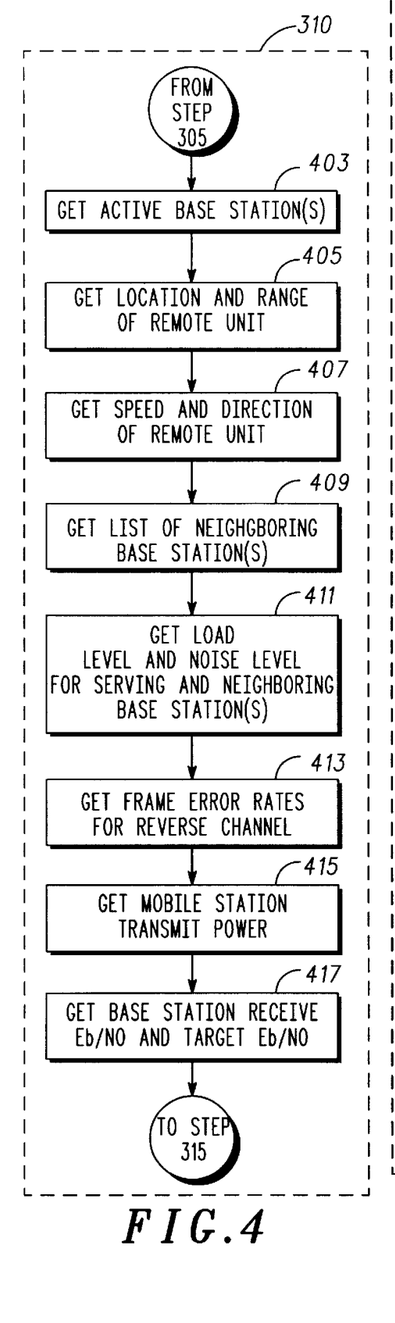
FIG. 4 is a flow chart illustrating the steps required to gather remote unit environmental parameters as shown in FIG. 3.

FIG. 4 is a flow chart illustrating the steps required to gather remote unit environmental parameters as discussed above in step 310 of FIG. 3. The logic flow (originating from step 305 of FIG. 3) begins at step 403 where a list of active base stations are obtained by MSCC 223 from call list and call state storage 201. Once obtained, the identity of each active base station is stored in base station list storage 219 and flagged as a serving base station. Next, at step 405 the location and range of remote unit 113 is obtained. In a preferred embodiment of the present invention this is accomplished by location finding equipment 211. In particular, location finding equipment 211 utilizes the technique described in U.S. Pat. No. 5,508,708 "Method and Apparatus for Location Finding in a CDMA System" by Ghosh, et al. and incorporated by reference herein. Next, at step 407, the speed and direction of remote unit 113 is determined. Location finding equipment 211 utilizes the technique described in United States Pat. No. (Ser. No. 08/616,797) to determine remote unit's 113 speed. In the preferred embodiment of the present invention remote unit 113 direction is determined by taking two different location measurements taken at different points in time separated by one second. At step 409, MSCC 223 determines neighboring base stations by accessing the system configuration storage 229 for the geographic coordinates of system base stations and selecting base stations whose coordinates surround the remote unit 113 or are located in places desirable for improving uplink channel communications. MSCC 223 then stores the neighboring base stations in base station list storage 219, and flags them as neighbor base stations. Next, at step 411 the load level and noise level for each serving and neighboring base station is obtained by processor 213 from cell loading and noise level information storage 203. In a preferred embodiment of the present invention, this information is obtained by processing information from call list and call state storage 201 and by fetching and storing signal strength information from the appropriate base stations. At step 413 reverse channel frame error rates are determined by processor 213, fetching this information from active base station(s). At step 415 remote unit's 113 transmit power is determined by processor 213, fetching the power set command information from either the active base station or requesting power status from the remote device, and finally at step 417 the base station Eb/No and target Eb/No is determined by processor 213 from the active base station(s). The logic flow then continues to step 315 of FIG. 3 where the environmental parameters obtained will be analyzed to determine if an orphan condition is likely.

Figure 5:
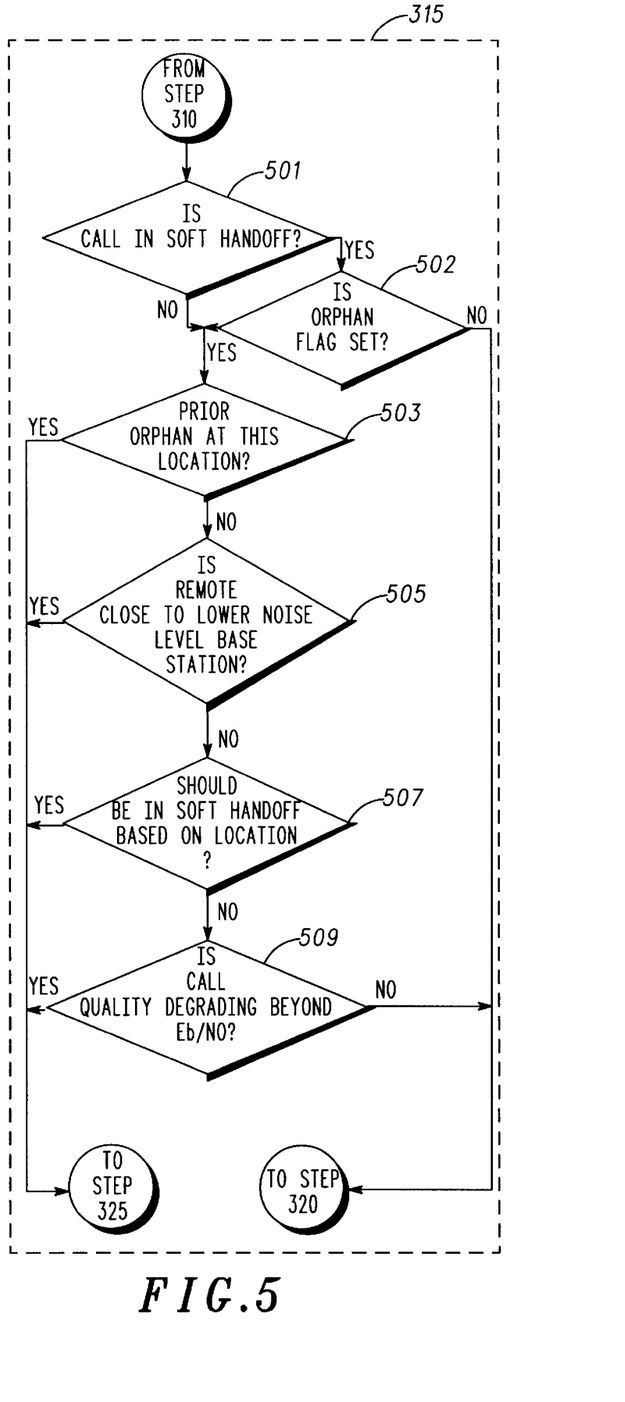
FIG. 5 is a flow chart illustrating the steps required to determine if the remote unit is likely to become an orphan as shown in FIG. 3.

FIG. 5 is a flow chart illustrating the steps required to determine if remote unit 113 is likely to become an orphan as discussed above in step 315 of FIG. 3. In the preferred embodiment of the present invention, environmental parameters obtained from step 310 of FIG. 3 are utilized to determine the probability that remote unit 113 will become an orphan. The logic flow originates from step 310 (FIG. 3). At step 501 it is determined by mobile system call controller 223 (by accessing call list and call state storage 201) if remote unit 113 is in soft handoff. If, at step 501 it is determined that remote unit 113 is in soft handoff with a base station other than the orphan base station, then the logic flow continues to step 502 where it is determined if the orphan flag has been set. If at step 502 it is determined that the orphan flag has been set, then the logic flow continues to step 503, otherwise the logic flow continues to step 320. If at step 501 it is determined that the remote unit is not in soft handoff, then the logic flow continues to step 503 where it is determined by processor 213 (by accessing historical orphan data storage 209) if a prior orphan condition arose by any remote unit at this location. In particular, processor 213 utilizes the location or range of remote unit (determined in step 405 of FIG. 4) and compares this location to all locations stored in historical orphan data storage 209. If the location or range of remote unit is near a region stored in historical orphan data storage 209, then an orphan condition is likely and the logic flow continues to step 325 (FIG. 3), otherwise the logic flow continues to step 505.

At step 505 processor 213 determines if remote unit 113 is close to a low noise or high load base station. Remember, that in situations where an orphan condition is likely, remote unit's 113 transmissions are received by a neighboring base station, but for reasons discussed above, remote unit 113 is unable to add that base station to its active set. Processor 213 determines when this situation occurs (at step 505) by obtaining the load level and noise level for the serving and neighboring base stations (step 411 of FIG. 4). If at step 505 it is determined that the serving base station has a higher transmit load or that a neighboring base station has a lower receive noise level, then an orphan condition is likely and the logic flow continues to step 325 (FIG. 3), otherwise the logic flow continues to step 507.

At step 507 processor 213 determines (by fetching information stored in location finding equipment 211) if remote unit 113 is near a neighbor cell or is near the cell border. For example, the range of remote unit 113 may be beyond the cell border or it may be located near a high load base station. If processor 213 determines remote unit 113 is near the cell border then it is likely that an orphan condition exists and the logic flow continues to step 325 (FIG. 3); otherwise, the logic flow continues to step 509.

At step 509 it is determined by processor 213 (by fetching information from active base station(s)) if the call quality of remote unit 113 is degrading below a threshold level. For example, remote unit 113 may be in a situation where call quality is degraded to a level where the call is in danger of being dropped by the serving base station. Normally, (non orphan situations) such a call would already be in a soft handoff situation, and handoff would occur to another base station, but in this situation no soft handoff situation exists, indicating a possible orphan situation. In the preferred embodiment of the present invention MSCC 223 determines if the uplink channel has (on average) an Eb/No value less than a target Eb/No and if so an orphan condition is likely and the logic flow continues to step 325 (FIG. 3), otherwise the logic flow continues to step 320 (FIG. 3). In an alternate embodiment of the present invention the determination is made by processor 213 fetching active base station traffic channel transmit power and mobile station transmit power and comparing them for balance. If there is an unaccounted for imbalance (if one signal is very much stronger than another), then it is likely that the orphan condition exists and the logic flow continues to step 325 (FIG. 3); otherwise, the logic flow continues to step 320 (FIG. 3)

Figure 6:
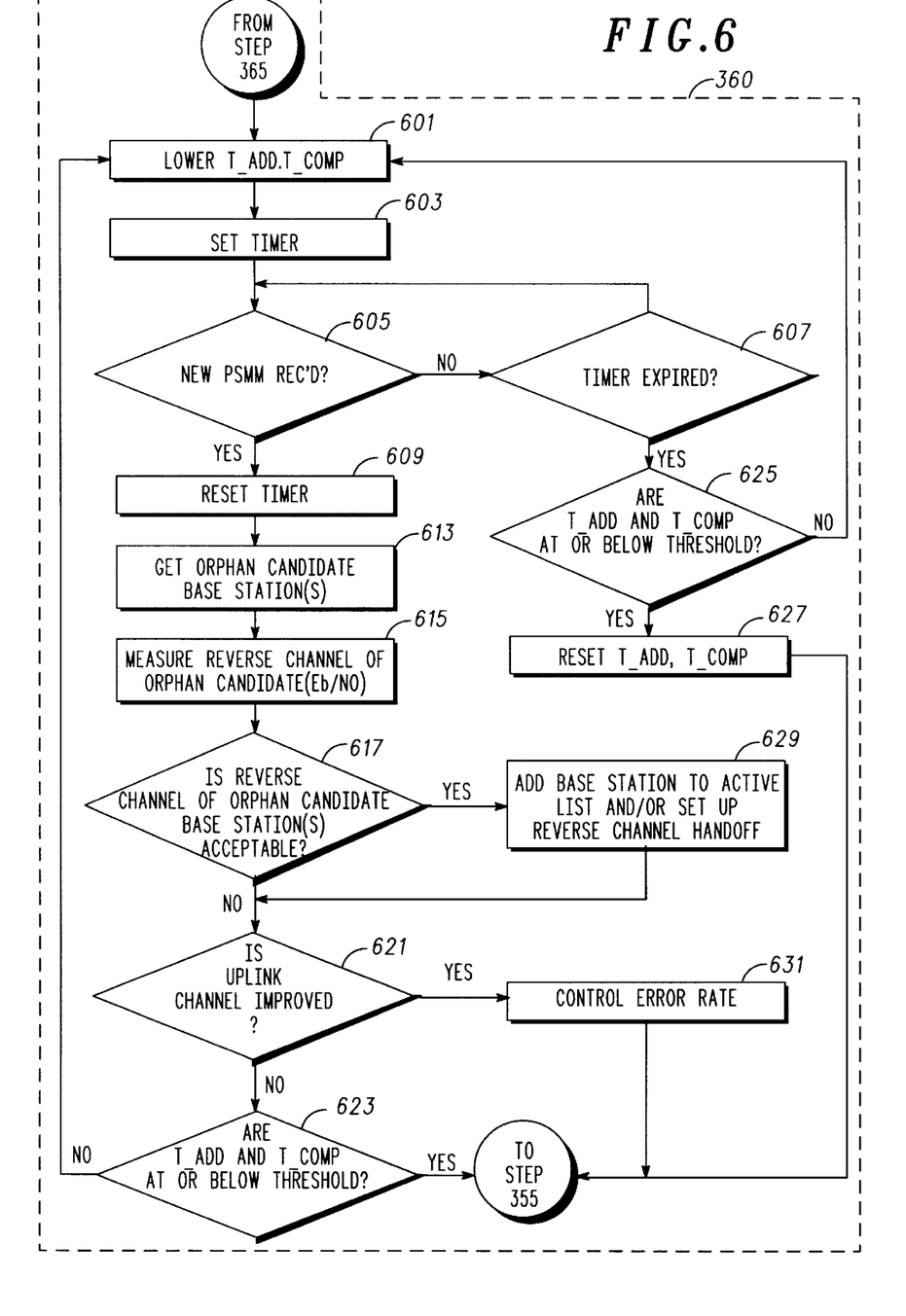
FIG. 6 is a flow chart illustrating the steps required to adjust T_ADD, T_COMP, and the active list as shown in FIG. 3.

FIG. 6 is a flow chart illustrating the steps required to adjust T_ADD, T_COMP, and the active list as discussed above in step 360 of FIG. 3. The logic flow begins at step 601 where T_ADD and T_COMP are incrementally lowered. As discussed above, T_ADD is incrementally reduced by 1 dB until a minimum value of −19 dB is achieved while T_COMP is incrementally reduced by 1 dB until a minimum value of 0 dB is achieved. Reducing T_ADD and T_COMP will have the effect of remote unit 113 sending additional PSMMs to the serving base station(s). In particular every time remote unit 113 encounters a base station not in the active having a pilot signal strength above the reduced T_ADD, it sends a PSMM to the base station(s) in the active set. The base station(s) in the active set then assigns a downlink traffic channel associated with the candidate pilot to the remote unit and directs remote unit 113 to perform a handoff to the candidate base station, bringing the candidate base station into the active set. Additionally, when the pilot strength associated with a non-active set candidate base station exceeds the pilot strength associated with a base station in the active set by a preset threshold (T_COMP * 0.5 dB) the remote unit sends a PSMM to the base station(s) in the active set. In an alternate embodiment of the present invention, the orphan base station is not put in the active set, but the signal it receives from remote unit 113 is used to improve reverse channel reception of remote unit 113.

Continuing, next, at step 603 a timer is set. In particular, a timer is set so that a maximum amount of time will elapse without receiving a PSMM. At step 605 it is determined if a new PSMM has been received, and if not, the logic flow continues to step 607. If at step 605 it is determined that a new PSMM has been received, then the timer is reset (step 609) and the logic flow continues to step 613 where the identity of the new base station(s) is determined from the PSMM. The new base station(s) (hereinafter referred to as the orphan candidate base station(s)) potentially contribute (s) to the orphan condition since it is being received by remote unit 113 at a low energy level. Next, at step 615 the reverse channel Eb/No of the orphan candidate base station is measured and at step 617 it is determined if the signal strength of the orphan candidate base station is adequate for reception. If, at step 617 it is determined that the reverse channel of the orphan candidate base station is acceptable, then the orphan candidate base station is included in uplink reception. When the orphan candidate base station is found acceptable, processor 213 adds the location of remote unit 113 to historical orphan data storage 209 and the orphan candidate base station to base station list storage 219. In the preferred embodiment of the present invention the orphan base station is added to the active list (step 629) and the logic flow continues to step 621. In the alternate embodiment of the present invention the orphan base station is put into reverse channel soft handoff only at step 629, by including it in reverse channel reception but not elevating it to the active set. Due to the signal imbalances between the orphan candidate base station and the active base station, the remote unit power control signal generated by the orphan candidate base station may be used by the active base station place of its own generated power control bit values. If at step 617 it is determined that the reverse channel of the orphan candidate base station is not acceptable, then the logic flow continues to step 621 where it is determined if the quality of the uplink channel has improved, and if so, at step 631 the remote unit is power controlled to a 1% FER and the logic flow continues to step 335 (FIG. 3). If at step 621 it is determined that the quality of the uplink channel has not improved, then at step 623 it is determined if T_ADD and T_COMP are at or below their minimum thresholds, and if so the logic flow continues to step 335 (FIG. 3). If at step 623 it is determined that T_ADD and T_COMP are above their minimum thresholds then the logic flow returns to step 601 where T_ADD and T_COMP are again lowered.

Returning to step 605, if it has been determined that no PSMM has been received the logic flow continues to step 607 where it is determined if the timer has expired. If at step 607 it is determined that the timer has not expired the logic flow returns to step 605 otherwise the logic flow continues to step 625. At step 625 it is determined if T_ADD and T_COMP are at or below a threshold level. In particular it is determined if T_ADD or T_COMP is at or below −19 dB and 0 dB respectively. If at step 625 it is determined that T_ADD or T_COMP are at or below their threshold levels then T_ADD and T_COMP are reset to their original values in step 627 and the logic flow continues to step 335 (FIG. 3), otherwise the logic flow returns to step 601.

Figure 7:
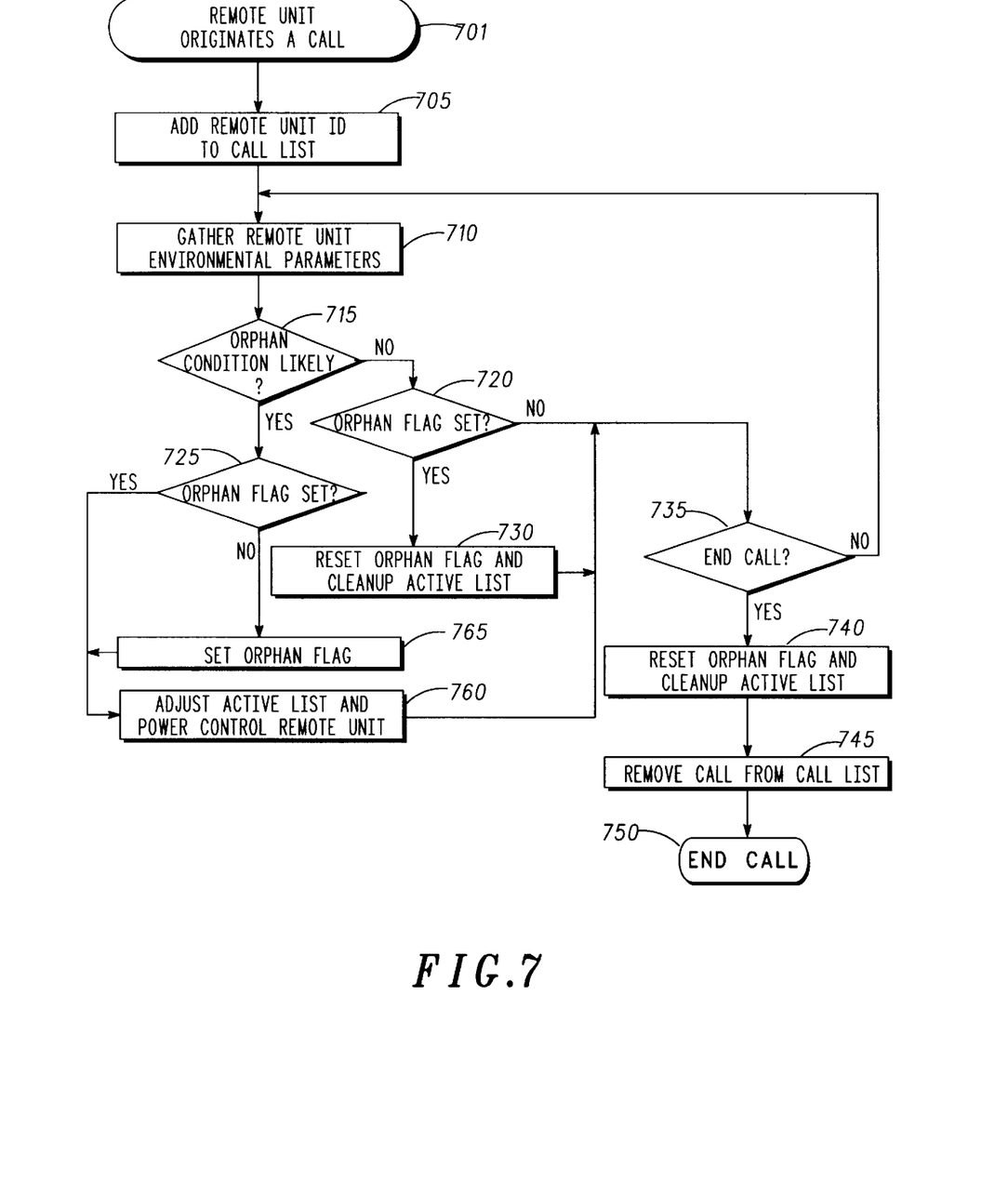
FIG. 7 is a flow chart illustrating the operation of the Centralized Base Station Controller of FIG. 2 in accordance with an alternate embodiment of the present invention.

FIG. 7 is a flow chart illustrating operation of CBSC 103 of FIG. 1 in accordance with an alternate embodiment of the present invention. In this embodiment T_ADD and T_COMP are not adjusted, but rather potential orphan base stations are determined and any orphan base station is added to remote unit's 113 active list. By adding an orphan base station to remote unit's 113 active list, communication is established between the orphan base station and remote unit 113, eliminating the orphan condition. The logic flow begins at step 701 where remote unit 113 originates a call (call may also originate from a landline source). At step 705 MSCC 223 adds remote unit 113 to the call list by storing a remote unit identification number in call list and call state storage 201. Next, at step 710 environmental parameters are gathered regarding the state of remote unit 113 (as discussed in reference to FIG. 4). Next, at step 715 processor 213 determines if an orphan condition is likely. (as discussed in reference to FIG. 5) and if not the logic flow continues to step 720. If at step 715 processor 213 determines that an orphan condition is likely, then at step 725 MSCC 223 determines if the orphan flag has been set, and if so, the logic flow continues to step 760. If at step 725 it is determined that an orphan flag has not been set, then at step 765 MSCC 223 sets an orphan flag to a positive state and the logic flow continues to step 760. At step 760 remote unit's 113 active list is adjusted. In the alternate embodiment of the present invention, this is accomplished by MSCC 223 accessing the list of neighboring base stations acquired in step 409 (FIG. 4) and for each base station in the list performing measurements at that base station of the reverse channel of remote unit 113. Base stations which receive acceptable reverse channel signals for remote unit 113 are added to the active list and stored in the active list in base station list storage 219.

Returning to step 720, if the orphan flag has been set, then the flag is reset and the active list is cleaned-up at step 730 to remove the base station from the active list and the logic flow continues to step 735. At step 735 MSCC 223 determines if remote unit 113 has ended the call, and if not the logic flow returns to step 710. However, if it has been determined at step 735 that remote unit 113 has ended the call, the logic flow continues to step 740 where MSCC 223 accesses call status record, resets the orphan flag, and cleans up the active set (if there remain any newly added base stations). Next at step 745, MSCC 223 removes remote unit 113 from the call list and the logic flow ends at step 750.

Figure 8:
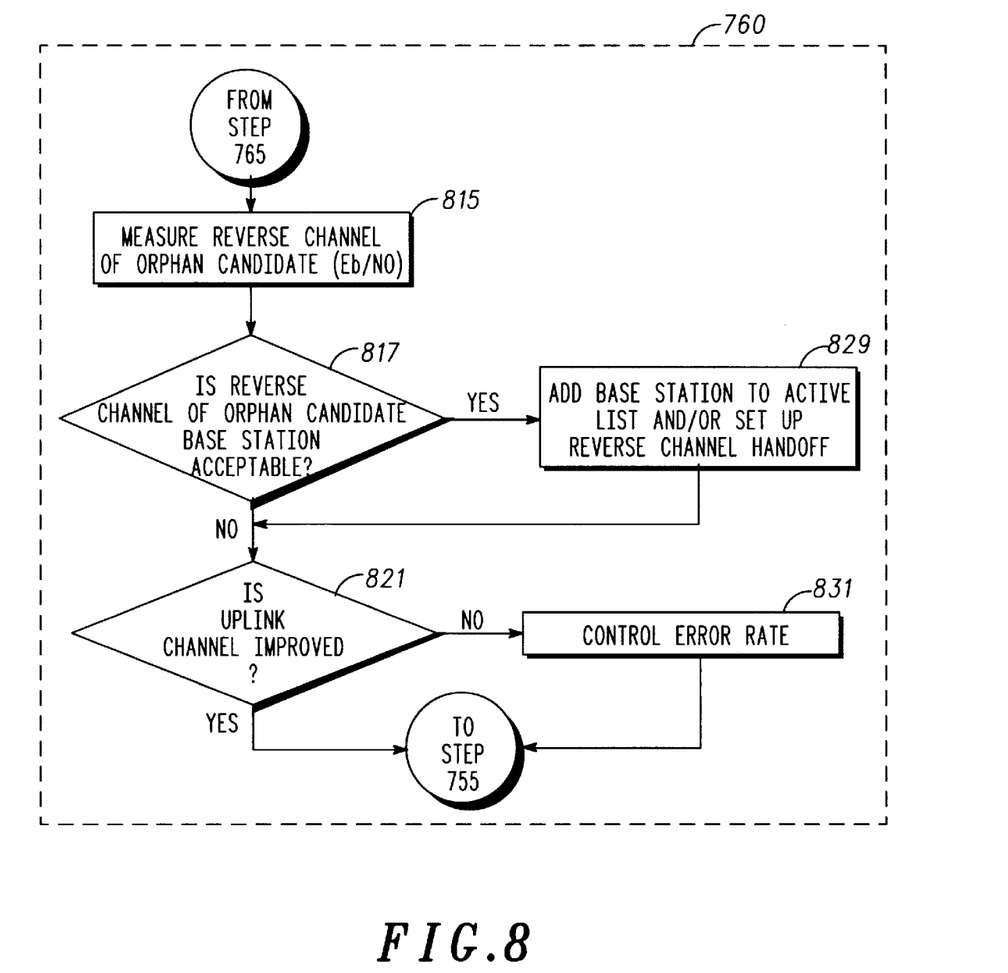
FIG. 8 is a flow chart illustrating the steps required to determine if remote unit is likely to become an orphan in accordance with an alternate embodiment of the present invention.

FIG. 8 is a flow chart illustrating the steps required to the adjust the active list as discussed above in step 760 of FIG. 7. The logic flow begins at step 815 where the reverse channel Eb/No of the neighboring candidate base station is measured and at step 817 it is determined if the signal strength of the neighboring candidate base station is adequate for reception. If, at step 817 it is determined that the reverse channel of the neighboring candidate base station is acceptable, then the neighbor candidate base station is included in uplink reception. In the alternate embodiment of the present invention this reverse channel soft handoff is autonomous and is added to the active list at step 829. The logic flow then continues to step 821. If at step 817 it is determined that the reverse channel of the orphan candidate base station is not acceptable, then the logic flow continues to step 821 where it is determined if the quality of the uplink channel has improved, and if so, at step 831 the remote unit is power controlled to a 1% FER and the logic flow continues to step 735 (FIG. 7). If at step 821 it is determined that the quality of the uplink channel has not improved, then logic flow continues to step 735.

Figure 9:
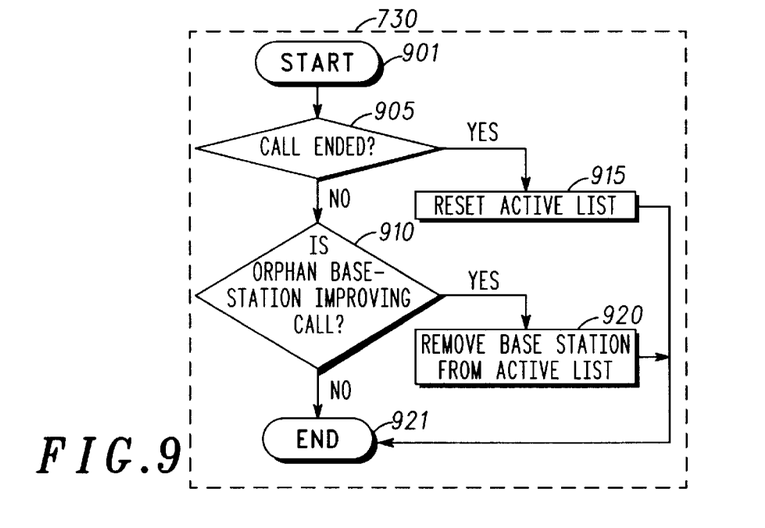
FIG. 9 is a flow chart illustrating the steps required to cleanup the active base station list in accordance with the alternate embodiment of the present invention.

FIG. 9 is a flow chart illustrating the steps required for cleanup (reduce the active base station list) as discussed above in step 730 and 740 of FIG. 7. At step 905 a check is made to determine if the call has completed and resources are being released, if it is so, then the active set for that remote unit is reset in step 915. If the call is still in progress the logic flow continues to step 910 where it is determined if the orphan likely condition still exists (if the base station which was added to the active set is improving the call). If at step 910 it is determined that the orphan condition is unlikely, then the base station is left in the active set otherwise the base station is removed from the active set (step 920) and the logic flow continues to step 735.

While the invention has been particularly shown and described with reference to a particular embodiment, it will be understood by those skilled in the art that various changes in form and details may be made therein without departing from the spirit and scope of the invention, and it is intended that all such modifications come within the scope of the following claims.

What is claimed is:

1. A method for mitigating an orphan condition in a spread-spectrum communication system, the method comprising the steps of:

receiving a signal transmitted by a remote unit;

measuring a signal quality of the transmitted signal at a base station;

determining when the remote unit is not handing off to an acceptable base station;

adding more base stations to an active list in response to the determination; and communicating with the remote unit with more than one base station in response to the step of adding.

2. The method of claim 1 wherein the step of determining comprises the steps of:

determining a location of the remote unit; and determining if a prior orphan condition arose by a second remote unit at the location.

3. The method of claim 1 wherein the step of determining comprises the steps of:

obtaining a load level and a noise level for a serving and a neighboring base station; and determining that the neighboring base station has a lower receive noise level than the serving base station.

4. The method of claim 1 wherein the step of determining comprises the step of determining if the remote unit is near a neighbor cell.

5. The method of claim 1 wherein the step of determining comprises the step of determining if a call quality of the remote unit is degrading below a threshold level.

6. The method of claim 1 wherein the step of adding more base stations to the active list comprises the steps of:

adjusting T_ADD; and adding more base stations to the active list in response to the step of adjusting.

7. The method of claim 1 wherein the step of adding more base stations to the active list comprises the steps of:

adjusting T_COMP; and adding more base stations to the active list in response to the step of adjusting.

8. The method of claim 1 wherein the step of adding more base stations to the active list comprises the steps of:

determining if a base station is a neighboring base station;

measuring, at the neighboring base station, a reverse channel of the remote unit; and adding the neighboring base station to the active list based on the step of measuring.

9. A method for mitigating an orphan condition within a cellular communication system, the method comprising the steps of:

determining when a remote unit has a high probability of becoming an orphan;

adjusting remote unit parameters based on the determination, wherein remote unit parameters are selected from a group consisting of T_ADD and T_COMP; and communicating with additional base stations based on the step of adjusting.

10. The method of claim 9 wherein the step of determining when the remote unit has a high probability of becoming an orphan comprises the steps of:

determining a location of the remote unit; and determining if a prior orphan condition arose by a second remote unit at the location.

11. The method of claim 9 wherein the step of determining when the remote unit has a high probability of becoming an orphan comprises the steps of:

obtaining a load level and a noise level for a serving and a neighboring base station; and determining that the neighboring base station has a lower receive noise level than the serving base station.

12. The method of claim 9 wherein the step of determining when the remote unit has a high probability of becoming an orphan comprises the step of determining if the remote unit is near a neighbor cell.

13. The method of claim 9 wherein the step of determining when the remote unit has a high probability of becoming an orphan comprises the step of determining if a call quality of the remote unit has degraded below a threshold level.

14. An apparatus for mitigating an orphan condition in a communication system, the apparatus comprising:

a historical orphan data storage outputting locations where a remote unit has historically been orphaned;

location finding equipment outputting a location of a remote unit; and a processor having as an input, the location of the remote unit and the locations where the remote unit has historically been orphaned and outputting a determination that the remote unit is not handing off to an acceptable base station.

* * * * *